(12) United States Patent
Chen et al.

(10) Patent No.: US 11,349,422 B2
(45) Date of Patent: May 31, 2022

(54) POWER DETECTING DEVICE AND METHOD THEREOF

(71) Applicant: Universal Scientific Industrial (Shanghai) Co., Ltd., Shanghai (CN)

(72) Inventors: Chih-Huang Chen, Shanghai (CN); Su-Hui Wang, Shanghai (CN); Chih-Hung Huang, Shanghai (CN); Lee-Han Lin, Shanghai (CN); Chien-Lin Liu, Shanghai (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 39 days.

(21) Appl. No.: 17/133,663

(22) Filed: Dec. 24, 2020

(65) Prior Publication Data

US 2022/0103105 A1 Mar. 31, 2022

(30) Foreign Application Priority Data

Sep. 30, 2020 (CN) .......................... 202011054080.0

(51) Int. Cl.
| | |
|---|---|
| *H02P 1/00* | (2006.01) |
| *H02P 3/00* | (2006.01) |
| *H02P 5/00* | (2016.01) |
| *H02P 21/22* | (2016.01) |
| *H02P 25/22* | (2006.01) |
| *H02P 27/12* | (2006.01) |

(Continued)

(52) U.S. Cl.
CPC .............. *H02P 21/22* (2016.02); *H02P 25/22* (2013.01); *H02P 27/12* (2013.01); *B60L 15/20* (2013.01); *B60L 50/60* (2019.02); *B60L 58/10* (2019.02); *B60L 2240/42* (2013.01); *B60L 2240/547* (2013.01); *B60L 2240/549* (2013.01); *H02P 2205/03* (2013.01)

(58) Field of Classification Search
CPC ........... H02P 21/22; H02P 25/22; H02P 27/12
USPC ....................................................... 318/139
See application file for complete search history.

(56) References Cited

U.S. PATENT DOCUMENTS

2018/0354549 A1* 12/2018 Tsubaki ................ H02P 29/032
2019/0291778 A1* 9/2019 Nagashima .......... B62D 5/0403
(Continued)

FOREIGN PATENT DOCUMENTS

| | | |
|---|---|---|
| CN | 105610128 A | 5/2016 |
| CN | 105978429 B | 8/2018 |
| TW | I511437 B | 12/2015 |

*Primary Examiner* — Erick D Glass
(74) *Attorney, Agent, or Firm* — CKC & Partners Co., LLC (57) ABSTRACT

A power detecting device includes a vehicle driving system, a battery detecting module and a controlling module. A first stator winding and a second stator winding are synchronized and connected in parallel with each other. A first end of a first current sensor is coupled to a first-phase winding end of the first stator winding for measuring a first-phase current. A first end of a second current sensor is coupled to a second-phase winding end of the first stator winding for measuring a second-phase current. The battery detecting module is coupled to a first power supply for measuring a current signal and a voltage signal. A controller generates a first power according to the current signal and the voltage signal and generates a second power according to a plurality of data from a database. The controller compares the first power with the second power to generate a detecting result.

13 Claims, 5 Drawing Sheets

(51) Int. Cl.
*B60L 58/10* (2019.01)
*B60L 15/20* (2006.01)
*B60L 50/60* (2019.01)

(56) References Cited

U.S. PATENT DOCUMENTS

2021/0188233 A1* 6/2021 Yuyama .................... B60T 8/92
2022/0045642 A1* 2/2022 Koseki ................. B62D 5/0481

* cited by examiner

POWER DETECTING DEVICE AND METHOD THEREOF

RELATED APPLICATIONS

This application claims priority to China Application Serial Number 202011054080.0, filed Sep. 30, 2020, which is herein incorporated by reference.

BACKGROUND

Technical Field

The present disclosure relates to a power detecting device and a power detecting method. More particularly, the present disclosure relates to a power detecting device and a power detecting method of a hybrid electric vehicle.

Description of Related Art

The general field-oriented control (FOC) theory mainly controls the magnitude of the three-phase current according to the position of the motor rotor and the phase of the corresponding stator magnetic field. In recent years, the power transistors (MOSFET or IGBT) are used as the switches and adjust the duty cycle of the switches so as to control the magnitude of the three-phase current. Each of the phases has a current sensor, and the current sensor makes the controlling current compensate the feedback. The most typical feedback compensation control theory is a proportional-integral-derivative (PID) controller. In the conventional art, two of the three phases are measured and the other phase is calculated. After the total current of each of the phases and the phases are finally obtained, the duty cycle for turning on and off the three-phase power transistor is controlled according to the current phasor, the coordinate conversion and the feedback compensation so as to stably control the output power of the motor, so that the driving mode and the power generating mode of the motor are regulated.

Although the above prior art can reduce the expensive current sensor, a power element lacking the current sensor to detect the phase signal cannot be monitored. In view of the above problems, how to develop a detecting device and a detecting method that can monitor the motor under all of operating conditions (e.g., under the specific controlling conditions of MOSFET or IGBT), which is highly anticipated by the public and becomes the goal of relevant industry efforts.

SUMMARY

According to an embodiment of an aspect of the present disclosure, a power detecting device includes a vehicle driving system, a battery detecting module and a controlling module. The vehicle driving system is driven by a first power supply and includes a three-phase motor, a first current sensor, a second current sensor, a first power module and a second power module. The three-phase motor includes a first stator winding and a second stator winding. The first stator winding is connected in parallel to the second stator winding, and the first stator winding and the second stator winding are synchronized with each other. Each of the first stator winding and the second stator winding includes a first-phase winding end, a second-phase winding end and a third-phase winding end. The first current sensor has a first end and a second end. The first end of the first current sensor is coupled to the first-phase winding end of the first stator winding, and the first current sensor is configured to measure a first-phase current of the first stator winding. The second current sensor has a first end and a second end. The first end of the second current sensor is coupled to the second-phase winding end of the first stator winding, and the second current sensor is configured to measure a second-phase current of the first stator winding. The first power module is electrically connected to the first power supply, the second end of the first current sensor, the second end of the second current sensor and the third-phase winding end of the first stator winding. The second power module is connected in parallel to the first power module and electrically connected to the first power supply, and the first-phase winding end, the second-phase winding end and the third-phase winding end of the second stator winding. The battery detecting module is coupled to the first power supply for measuring a current signal and a voltage signal of the first power supply. The controlling module is coupled to the battery detecting module and includes a controller and a database. The controller receives the current signal and the voltage signal and generates a first power according to the current signal and the voltage signal. The database includes a plurality of data of the three-phase motor. The controller generates a second power according to the data. The controller compares the first power with the second power to generate a detecting result.

According to an embodiment of another aspect of the present disclosure, a power detecting method includes a providing step, a paralleling step, a battery measuring step, a receiving step, a calculating step and a comparing step. The providing step is performed to provide the first power supply to drive the vehicle driving system. The vehicle driving system includes the three-phase motor. The paralleling step is performed to connect the first stator winding and the second stator winding of the three-phase motor in parallel. The first stator winding and the second stator winding are synchronized with each other. Each of the first stator winding and the second stator winding includes the first-phase winding end, the second-phase winding end and the third-phase winding end. The battery measuring step is performed to drive the battery detecting module to measure the current signal and the voltage signal of the first power supply. The receiving step is performed to drive the controlling module to receive the current signal and the voltage signal, and generate the first power according to the current signal and the voltage signal. The controlling module includes the controller and the database. The calculating step is performed to drive the controller to calculate the data of the database to generate the second power. The comparing step is performed to drive the controller to compare the first power with the second power to generate the detecting result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
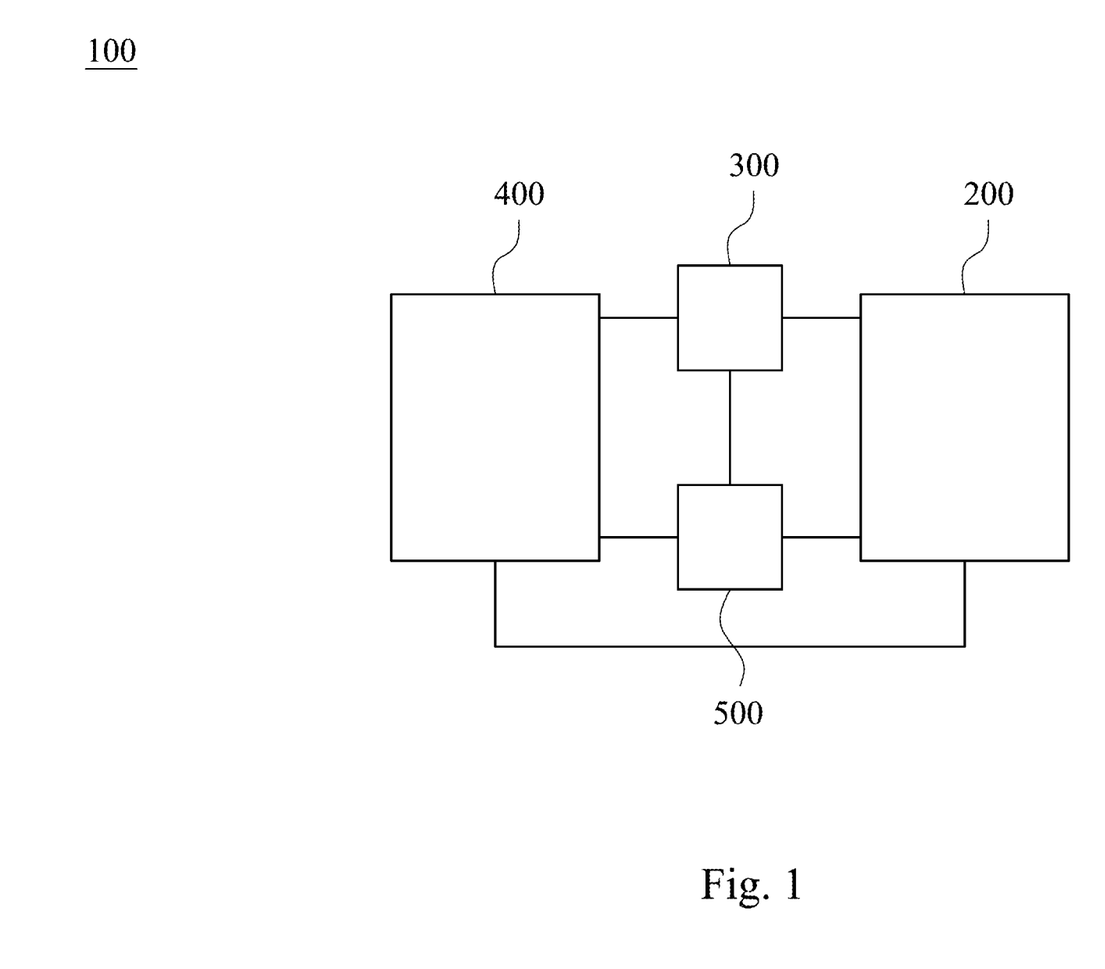
FIG. 1 shows a schematic view of a power detecting device according to an embodiment of a structural aspect of the present disclosure.

FIG. 1 shows a schematic view of a power detecting device 100 according to an embodiment of a structural aspect of the present disclosure. In FIG. 1, the power detecting device 100 includes a vehicle driving system 200, a battery detecting module 300, a controlling module 400 and a power supply module 500. The vehicle driving system 200 is driven by the power supply module 500 and electrically connected to the battery detecting module 300 and the controlling module 400. The battery detecting module 300 is electrically connected to the power supply module 500 and coupled between the vehicle driving system 200 and the controlling module 400 for detecting a current and a voltage of the power supply module 500. The controlling module 400 generates a detecting result and sets a range. When the detecting result is within the range, the vehicle driving system 200 is working normally. When the detecting result is out of the range, the controlling module 400 issues an alarm. The circuit diagram of the power detecting device 100 and the operating relationship of the internal components thereof will be described in detail below.

Figure 2:
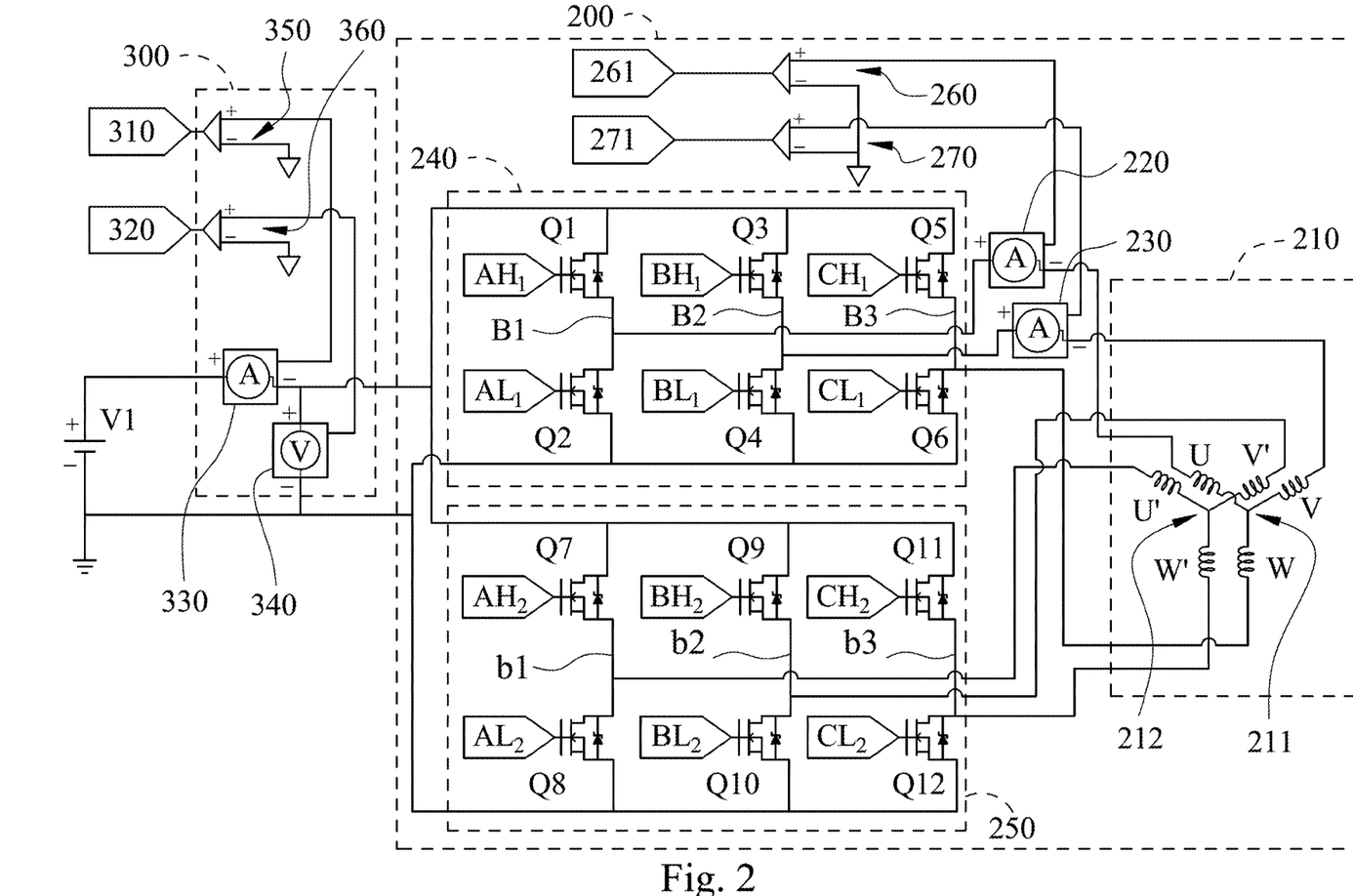
FIG. 2 shows a circuit diagram of a vehicle driving system and a battery detecting module of the power detecting device of FIG. 1.
Figure 3:
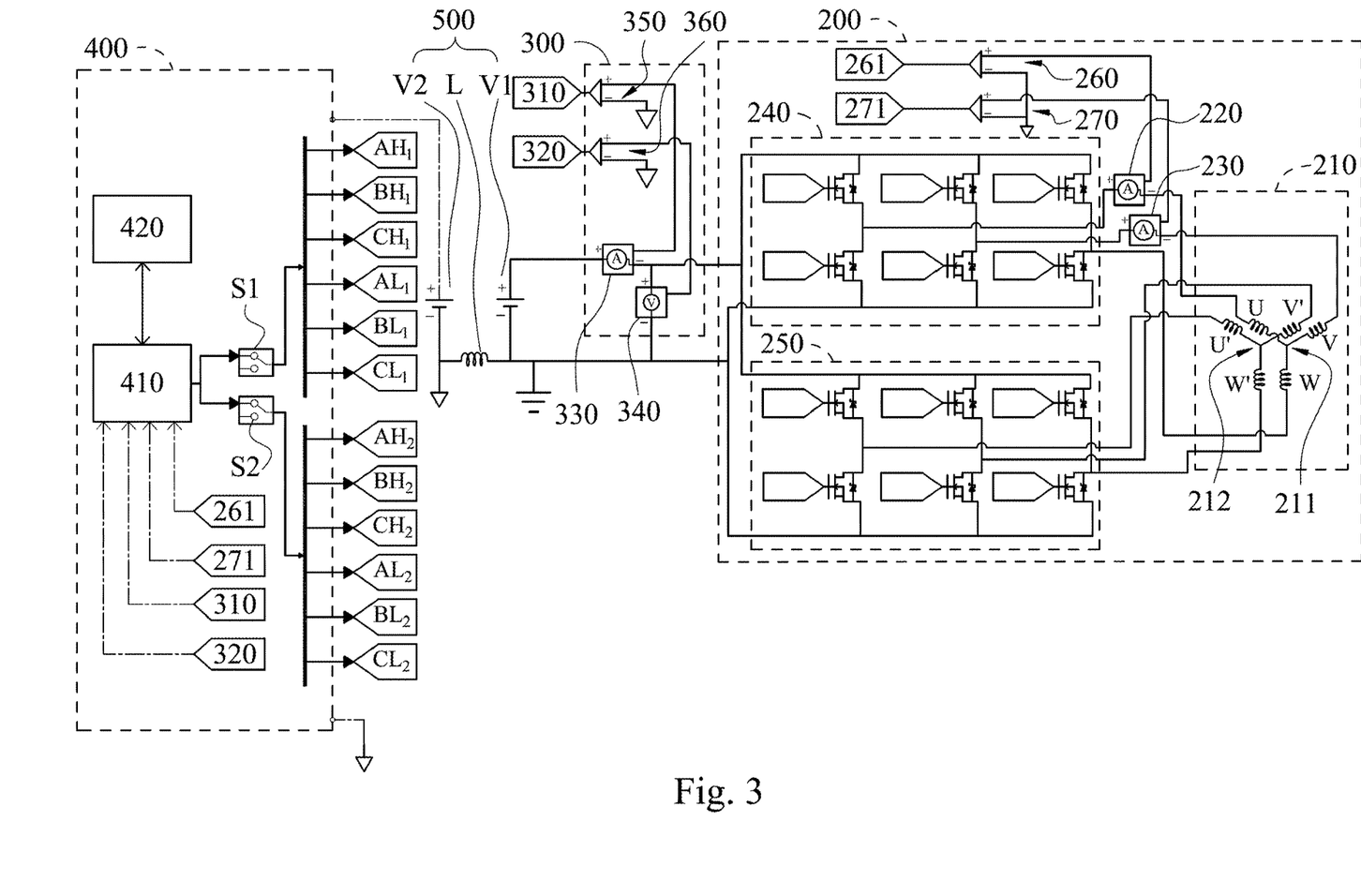
FIG. 3 shows a circuit diagram of the power detecting device of FIG. 1.

Please refer to FIGS. 2 and 3. FIG. 2 shows a circuit diagram of the vehicle driving system 200 and the battery detecting module 300 of the power detecting device 100 of FIG. 1. FIG. 3 shows a circuit diagram of the power detecting device 100 of FIG. 1. In FIGS. 2 and 3, the power supply module 500 can include a first power supply V1 and a second power supply V2. The vehicle driving system 200 is driven by the first power supply V1 and includes a three-phase motor 210, a first current sensor 220, a second current sensor 230, a first power module 240 and a second power module 250. The three-phase motor 210 includes a first stator winding 211 and a second stator winding 212. The first stator winding 211 is connected in parallel to the second stator winding 212. The first stator winding 211 and the second stator winding 212 are synchronized with each other; in other words, the first stator winding 211 and the second stator winding 212 have no phase difference therebetween.

The first stator winding 211 includes a first-phase winding end U, a second-phase winding end V and a third-phase winding end W. The second stator winding 212 includes a first-phase winding end U', a second-phase winding end V' and a third-phase winding end W.

The first current sensor 220 has a first end and a second end. The first end of the first current sensor 220 is coupled to the first-phase winding end U of the first stator winding 211. The first current sensor 220 is configured to measure a first-phase current (not shown) of the first stator winding 211. The second current sensor 230 has a first end and a second end. The first end of the second current sensor 230 is coupled to the second-phase winding end V of the first stator winding 211. The second current sensor 230 is configured to measure a second-phase current (not shown) of the first stator winding 211.

The first power module 240 is electrically connected to the first power supply V1, the second end of the first current sensor 220, the second end of the second current sensor 230 and the third-phase winding end W of the first stator winding 211. The second power module 250 is connected in parallel to the first power module 240 and electrically connected to the first power supply V1, and the first-phase winding end U', the second-phase winding end V' and the third-phase winding end W' of the second stator winding 212.

In addition, the first power module 240 can include two first power elements Q1, Q2, two second power elements Q3, Q4 and two third power elements Q5, Q6. The first power elements Q1, Q2 are connected in series with each other to form a first bridge arm B1. The first power elements Q1, Q2 have two controlling signals $AH_1$, $AL_1$, respectively. The first bridge arm B1 is electrically connected to the second end of the first current sensor 220. The second power elements Q3, Q4 are connected in series with each other to form a second bridge arm B2. The second power elements Q3, Q4 have two controlling signals $BH_1$, $BL_1$, respectively. The second bridge arm B2 is electrically connected to the second end of the second current sensor 230. The third power elements Q5, Q6 are connected in series with each other to form a third bridge arm B3. The third power elements Q5, Q6 have two controlling signals $CH_1$, $CL_1$, respectively. The third bridge arm B3 is electrically connected to the third-phase winding end W of the first stator winding 211.

The second power module 250 can include two first power elements Q7, Q8, two second power elements Q9, Q10 and two third power elements Q11, Q12. The first power elements Q7, Q8 are connected in series with each other to form a first bridge arm b1. The first power elements Q7, Q8 have two controlling signals $AH_2$, $AL_2$, respectively. The first bridge arm b1 is electrically connected to the first-phase winding end U' of the second stator winding 212. The second power elements Q9, Q10 are connected in series with each other to form a second bridge arm b2. The second power elements Q9, Q10 have two controlling signals $BH_2$, $BL_2$, respectively. The second bridge arm b2 is electrically connected to the second-phase winding end V' of the second stator winding 212. The third power elements Q11, Q12 are connected in series with each other to form a third bridge arm b3. The third power elements Q11, Q12 have two controlling signals $CH_2$, $CL_2$, respectively. The third bridge arm b3 is electrically connected to the third-phase winding end W of the second stator winding 212. Each of the power elements can be a Metal-Oxide-Semiconductor Field-Effect Transistor (MOSFET) or an Insulated Gate Bipolar Transistor (IGBT) as a switch, and each of the power elements can be driven by an isolated gate driver (not shown).

Furthermore, the battery detecting module 300 is coupled to the first power supply V1 for measuring a current signal 310 and a voltage signal 320 of the first power supply V1. The second power supply V2 can have a first end and a second end. The first power supply V1 is electrically connected to the second end of the second power supply V2, and the first end of the second power supply V2 is electrically connected to the controlling module 400 for driving the controlling module 400. Moreover, the power supply module 500 can further include an inductor L, which is disposed between the first power supply V1 and the second power supply V2 and electrically connected to the first power supply V1 and the second power supply V2.

In FIG. 3, the controlling module 400 is coupled to the battery detecting module 300 and includes a controller 410 and a database 420. The controller 410 receives the current signal 310 and the voltage signal 320 and generates a first power according to the current signal 310 and the voltage signal 320. The database 420 includes a plurality of data of the three-phase motor 210. The controller 410 generates a second power according to the data of the database 420. The controller 410 compares the first power with the second power to generate the detecting result. Therefore, the first power module 240 and the second power module 250 of the vehicle driving system 200 can be monitored under all of operating conditions. The controller 410 can include a processing unit (not shown) and a memory (not shown). The processing unit is configured to calculate and process the data. The memory is configured to access the data. The processing unit and the memory are conventional arts and not the focus of the present disclosure, and will not be described in detail herein.

It is worth noting that, the vehicle driving system 200 can further include a first amplifier 260 and a second amplifier 270. The first amplifier 260 is electrically connected to the first end of the first current sensor 220 to convert the first-phase current into a first-phase current signal 261. Similarly, the second amplifier 270 is electrically connected to the first end of the second current sensor 230 to convert the second-phase current into a second-phase current signal 271. The controller 410 receives the first-phase current signal 261 and the second-phase current signal 271 and calculates a third-phase current signal (not shown) of the first stator winding 211 according to the first-phase current signal 261 and the second-phase current signal 271. A duty cycle between the first power module 240 and the second power module 250 is controlled according to a feedback compensation of the first-phase current signal 261, the second-phase current signal 271 and the third-phase current signal of the first stator winding 211.

It is worth mentioning that, the controlling module 400 can further include a first switch 51 and a second switch S2. The first switch 51 is coupled to the first power module 240. The second switch S2 is coupled to the second power module 250. The controller 410 synchronizes the first power module 240 and the second power module 250 through the first switch 51 and the second switch S2. A calculating procedure of the third-phase current signal is similar to a field-oriented control (FOC) theory, wherein the third-phase current signal is controlled by a feedback of the first-phase current signal 261 and the second-phase current signal 271. Since the three-phase radian is $2\pi$ (that is, 360°), the third-phase current signal is calculated through the controller 410. The FOC theory is the conventional art, and will not be described in detail herein.

The first-phase winding end U, the second-phase winding end V and the third-phase winding end W of the first stator winding 211 can be Y-connected (Star) or Δ-connected (Delta) to each other. The first-phase winding end U', the second-phase winding end V' and the third-phase winding end W of the second stator winding 212 can be Y-connected (Star) or Δ-connected (Delta) to each other. The stator windings of the three-phase motor 210 can also be plural. The stator windings are connected in parallel in the winding groove of the motor. No matter how many sets of the stator windings are connected in parallel, the control of the three-phase motor 210 only needs to detect two phase currents of one set of the stator windings. The embodiment of the present disclosure includes two stator windings. The obtained first-phase current signal 261, the obtained second-phase current signal 271 and the third-phase current signal are multiplied by two times via to stably control the torque and the speed of the three-phase motor 210 or the power generation of the three-phase motor 210, but the present disclosure is not limited to the embodiment.

Especially, the battery detecting module 300 can include a third current sensor 330, a voltage sensor 340, a third amplifier 350 and a fourth amplifier 360. The third current sensor 330 is connected in series to the first power supply V1. The voltage sensor 340 is connected in parallel to the first power supply V1. The third amplifier 350 is electrically connected to the third current sensor 330 for outputting the current signal 310. The fourth amplifier 360 is electrically connected to the voltage sensor 340 for outputting the voltage signal 320.

In detail, the detecting device of the prior art must add a master switch between the power supply and the power element to switch a detecting mode and an operating mode of the vehicle. When the motor is running, the power element cannot be detected. Therefore, the prior art is limited to some operating conditions (e.g., the prior art can only be monitored in the detecting mode). The power detecting device 100 of the present disclosure uses the pre-established database 420 of the three-phase motor 210 to measure an input power and an output power of the three-phase motor 210, and the detecting result is calculated through the controlling module 400. When the detecting result exceeds the range of the normal working, the controlling module 400 issues the alarm.

More detail, the vehicle driving system 200 can operate in a power generating mode or a driving mode. When the vehicle driving system 200 charges the first power supply V1, the vehicle driving system 200 enters in the power generating mode. When the first power supply V1 supplies the power to the vehicle driving system 200, the vehicle driving system 200 enters in the driving mode. In addition, a part of power generating efficiency of the three-phase motor 210 is summarized in Table 1 (S represents a speed (rpm), and T represents a torque (Nm)). A part of driving efficiency of the three-phase motor 210 is summarized in Table 2. The power generating efficiency and the driving efficiency are part of the data of the database 420, but are not limited to the present disclosure.

TABLE 1

| | S | | |
|---|---|---|---|
| T | 5900 | 6100 | 6500 |
| 20 | 0.93 | 0.95 | 0.93 |
| 10 | 0.85 | 0.85 | 0.83 |

TABLE 2

| T | S | | |
|---|---|---|---|
|   | 5500 | 6000 | 6500 |
| 16 | 0.91 | 0.87 | 0.85 |
| 8 | 0.85 | 0.83 | 0.81 |

When the vehicle driving system 200 is in the power generating mode, a generating input power $PG_{in}$ and a generating output power $PG_{out}$ of the three-phase motor 210 conform to the following equations (1) and (2):

$$PG_{in} = \text{Torque} \times \text{Speed} \times \frac{2\pi}{60}. \tag{1}$$

$$PG_{out} = V_{out} \times I_{out}. \tag{2}$$

Torque is the torque of the three-phase motor 210. Speed is a rotation speed of the three-phase motor 210. $V_{out}$ is the voltage signal 320 (e.g., 48V), and $I_{out}$ is the current signal 310 (e.g., 252.85A).

The controller 410 generates the first power P1 (that is, the generating output power $PG_{out}$) according to the current signal 310 and the voltage signal 320. The controller 410 generates the second power P2 (that is, the generating input power $PG_{in}$) according to the data of the database 420. The controller 410 compares the first power P1 with the second power P2 to generate the detecting result (that is, the power generating efficiency $\eta_1$), which conforms to the following equation (3):

$$\begin{cases} PG_{in} = 20(Nm) \times 6100(rpm) \times \frac{2\pi}{60} = P2 = 12776(W) \\ PG_{out} = 48(V) \times 252.85(A) = P1 = 12137(W) \\ \eta_1 = \frac{PG_{out}}{PG_{in}} = \frac{P1}{P2} = \frac{12137}{12776} = 0.95 \end{cases} \tag{3}$$

Similarly, when the vehicle driving system 200 is in the driving mode, a driving input power $PD_{in}$ and a driving output power $PD_{out}$ of the three-phase motor 210 conform to the following equations (4) and (5):

$$PD_{in} = V_{in} \times I_{in}. \tag{4}$$

$$PD_{out} = \text{Torque} \times \text{Speed} \times \frac{2\pi}{60}. \tag{5}$$

$V_{in}$ is the voltage signal 320 (e.g., 48V), and $I_{in}$ is the current signal 310 (e.g., 241A). The controller 410 generates the first power P1 (that is, the driving input power $PD_{in}$) according to the current signal 310 and the voltage signal 320. The controller 410 generates the second power P2 (that is, the driving output power $PD_{out}$) according to the data of the database 420. The controller 410 compares the first power P1 with the second power P2 to generate the detecting result (that is, the driving efficiency $\eta_2$), which conforms to the following equation (6):

$$\begin{cases} PD_{out} = 16(Nm) \times 6000(rpm) \times \frac{2\pi}{60} = P2 = 10053(W) \\ PD_{in} = 48(V) \times 241(A) = P1 = 11568(W) \\ \eta_2 = \frac{PD_{out}}{PD_{in}} = \frac{P2}{P1} = \frac{10053}{11568} = 0.87 \end{cases} \tag{6}$$

Finally, the controller 410 sets 5-10% of the power generating efficiency $\eta_1$ as a range of the upper limit and the lower limit and sets 5-10% of the driving efficiency $\eta_2$ as a range of the upper limit and the lower limit, but are not limited to the present disclosure. When the detecting result calculated by the controller 410 according to the current signal 310 and the voltage signal 320 is within the range, the vehicle driving system 200 is operating normally. When the detecting result exceeds the range, the controlling module 400 issues an alarm. Therefore, the power detecting device 100 of the present disclosure compares the output power of the three-phase motor 210 with the input power of the three-phase motor 210 in the current mode (i.e., the power generating mode or the driving mode) through the pre-established database 420 and the data so as to monitor each of the power elements.

Figure 4:
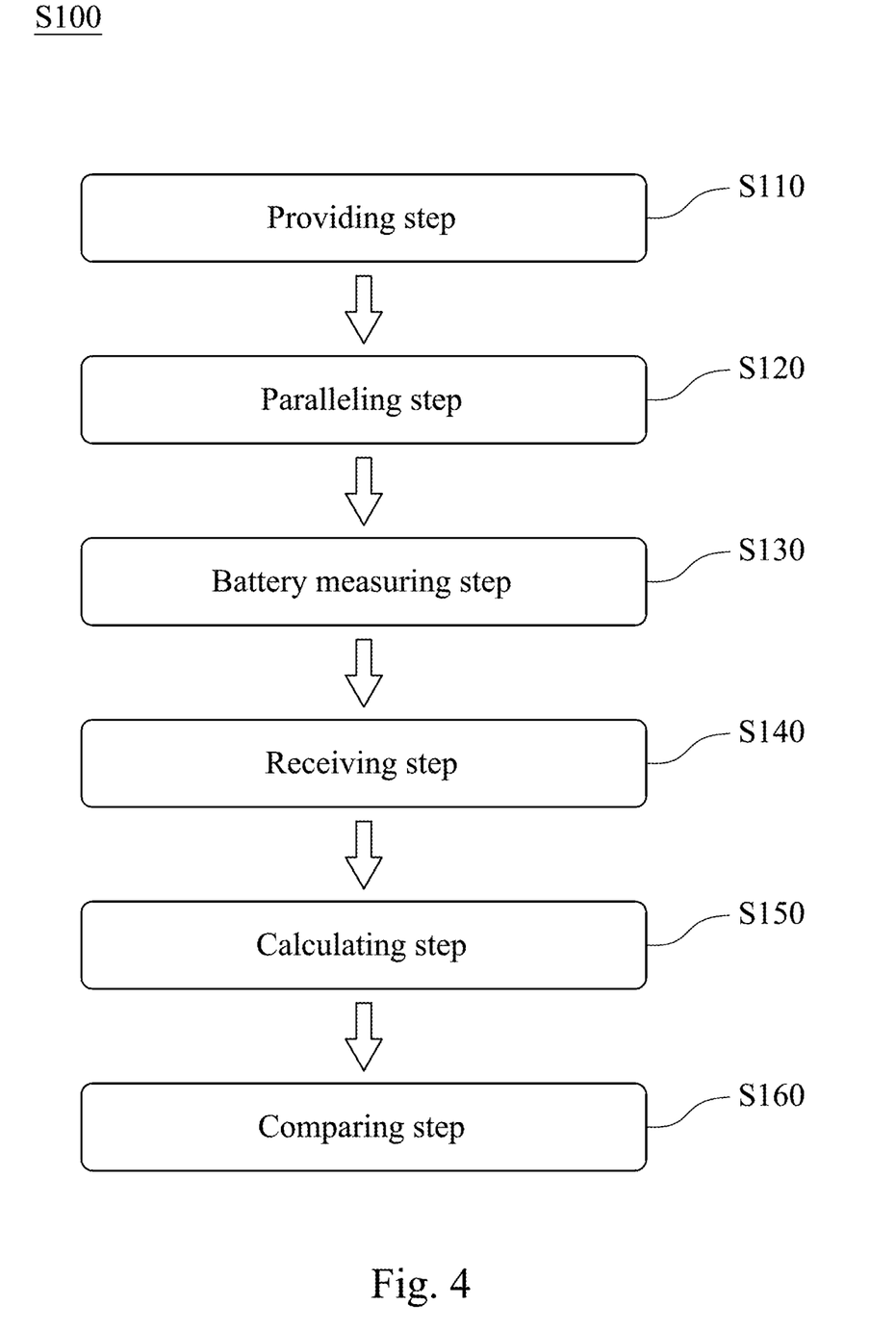
FIG. 4 shows a flow chart of a power detecting method according to an embodiment of a methodical aspect of the present disclosure.

Please refer to FIGS. 3 and 4. FIG. 4 shows a flow chart of a power detecting method S100 according to an embodiment of a methodical aspect of the present disclosure. In FIG. 4, the power detecting method S100 includes a providing step S110, a paralleling step S120, a battery measuring step S130, a receiving step S140, a calculating step S150 and a comparing step S160. The providing step S110 is performed to provide the first power supply V1 to drive the vehicle driving system 200. The vehicle driving system 200 includes the three-phase motor 210. The paralleling step S120 is performed to connect the first stator winding 211 and the second stator winding 212 of the three-phase motor 210 in parallel. The first stator winding 211 and the second stator winding 212 are synchronized with each other. The battery measuring step S130 is performed to drive the battery detecting module 300 to measure the current signal 310 and the voltage signal 320 of the first power supply V1. The receiving step S140 is performed to drive the controlling module 400 to receive the current signal 310 and the voltage signal 320, and generate the first power according to the current signal 310 and the voltage signal 320. The controlling module 400 includes the controller 410 and the database 420. The calculating step S150 is performed to drive the controller 410 to calculate the data of the database 420 to generate the second power. The comparing step S160 is performed to drive the controller 410 to compare the first power with the second power to generate the detecting result.

Therefore, the power detecting method S100 connects in parallel the three-phase stator windings with each other and measures a feedback current of each of the phases, and compares the output power with input power of the current three-phase motor 210 according to the data of the database 420 through the controlling module 400 to achieve more wider range of operating environment of the motor and the monitoring of the motor.

Figure 5:
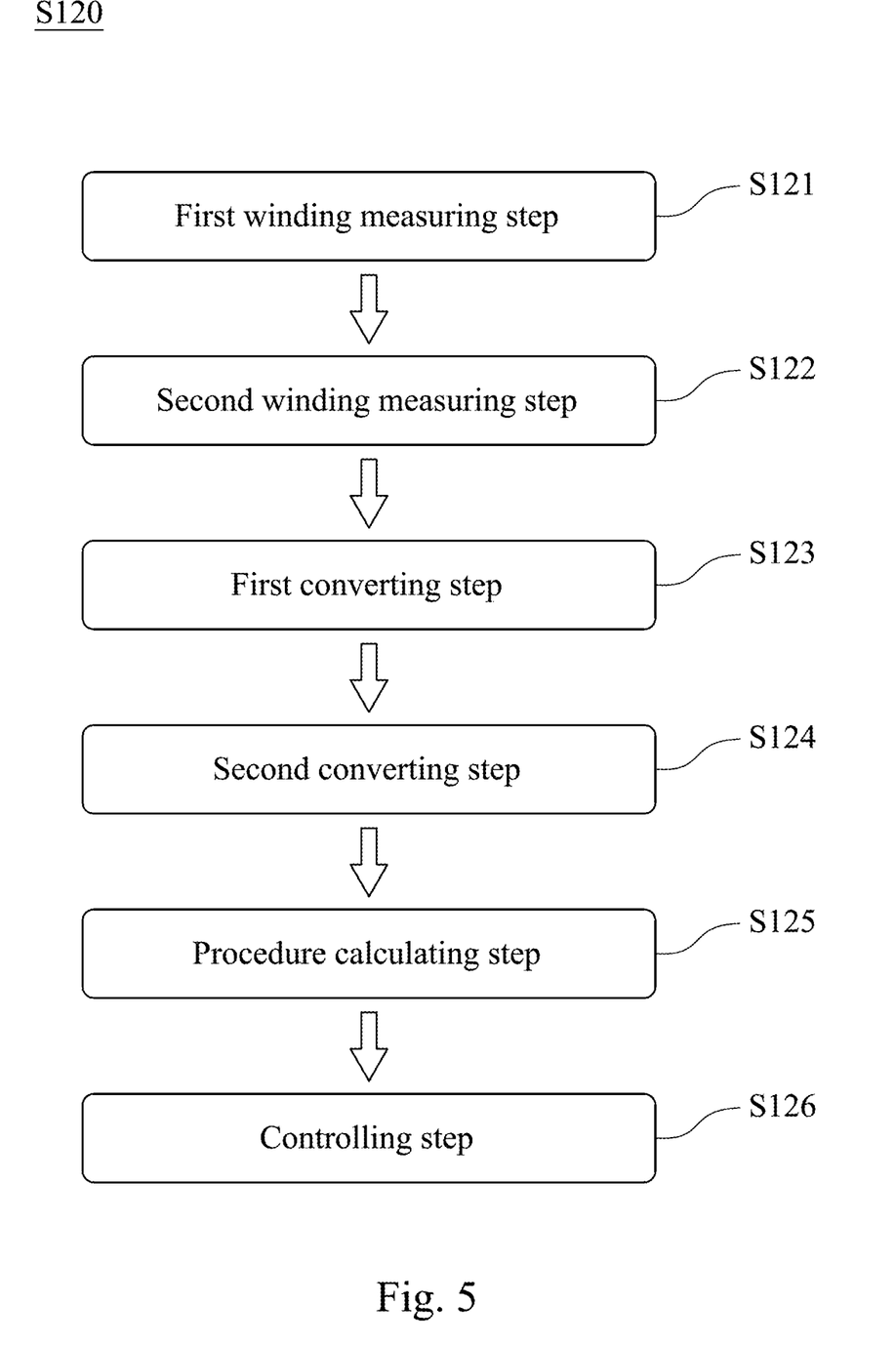
FIG. 5 shows a flow chart of a paralleling step of the power detecting method of FIG. 4.

FIG. 5 shows a flow chart of the paralleling step S120 of the power detecting method S100 of FIG. 4. In FIG. 5, the paralleling step S120 can include a first winding measuring step S121 and a second winding measuring step S122. The first winding measuring step S121 is performed to drive the first current sensor 220 to measure the first-phase current of the first stator winding 211 according to the first-phase winding end U of the first stator winding 211. The second winding measuring step S122 is performed to drive the second current sensor 230 to measure the second-phase current of the first stator winding 211 according to the second-phase winding end V of the first stator winding 211.

Further, the paralleling step S120 can further include a first converting step S123 and a second converting step S124. The first converting step S123 is performed to drive the first amplifier 260 to receive the first-phase current of the first stator winding 211, and convert the first-phase current into the first-phase current signal 261. The second converting step S124 is performed to drive the second amplifier 270 to receive the second-phase current of the first stator winding 211, and convert the second phase-current into the second-phase current signal 271.

Moreover, the paralleling step S120 can further include a procedure calculating step S125 and a controlling step S126. The procedure calculating step S125 is performed to drive the controller 410 to calculate the first-phase current signal 261 and the second-phase current signal 271 according to the calculating procedure to generate the third-phase current signal of the first stator winding 211. The controlling step S126 is performed to drive the controller 410 to synchronize the first power module 240 and the second power module 250 to operate the vehicle driving system 200 according to the feedback compensation of the first-phase current signal 261, the second-phase current signal 271 and the third-phase current signal of the first stator winding 211.

In summary, the present disclosure has the following advantages: First, the power detecting device can detect when the vehicle driving system is in any mode, and the power detecting device is no need to add a master switch for switching the modes, so that the operating conditions of the monitoring power element is more wider. Second, it is favorable for reducing the measured feedback current fluctuations of the other parallel windings so as to improve the output power and the efficiency of the motor. Third, it is favorable for reducing the use of the current sensors so as to reduce the manufacturing cost of the vehicle driving device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power detecting device, comprising:
   a vehicle driving system driven by a first power supply, and comprising:
     a three-phase motor comprising a first stator winding and a second stator winding, wherein the first stator winding is connected in parallel to the second stator winding, the first stator winding and the second stator winding are synchronized with each other, and each of the first stator winding and the second stator winding comprises a first-phase winding end, a second-phase winding end and a third-phase winding end;
     a first current sensor having a first end and a second end, wherein the first end of the first current sensor is coupled to the first-phase winding end of the first stator winding, and the first current sensor is configured to measure a first-phase current of the first stator winding;
     a second current sensor having a first end and a second end, wherein the first end of the second current sensor is coupled to the second-phase winding end of the first stator winding, and the second current sensor is configured to measure a second-phase current of the first stator winding;
     a first power module electrically connected to the first power supply, the second end of the first current sensor, the second end of the second current sensor and the third-phase winding end of the first stator winding; and
     a second power module connected in parallel to the first power module and electrically connected to the first power supply, and the first-phase winding end, the second-phase winding end and the third-phase winding end of the second stator winding;
   a battery detecting module coupled to the first power supply for measuring a current signal and a voltage signal of the first power supply; and
   a controlling module coupled to the battery detecting module and comprising a controller and a database, wherein the controller receives the current signal and the voltage signal and generates a first power according to the current signal and the voltage signal;
   wherein the database comprises a plurality of data of the three-phase motor, and the controller generates a second power according to the data;
   wherein the controller compares the first power with the second power to generate a detecting result.

2. The power detecting device of claim 1, wherein the vehicle driving system operates in a power generating mode or a driving mode,
   in response to determining that the vehicle driving system operates in the generating mode, the first power is a power generating output power, and the second power is a power generating input power; and
   in response to determining that the vehicle driving system operates in the driving mode, the first power is a driving input power, and the second power is a driving output power.

3. The power detecting device of claim 1, wherein the vehicle driving system further comprises:
   a first amplifier electrically connected to the first current sensor and converting the first-phase current into a first-phase current signal; and
   a second amplifier electrically connected to the second current sensor and converting the second-phase current into a second-phase current signal.

4. The power detecting device of claim 3, wherein,
   the controller receives the first-phase current signal and the second-phase current signal and calculates a third-phase current signal of the first stator winding according to the first-phase current signal and the second-phase current signal; and
   a duty cycle between the first power module and the second power module is controlled according to a feedback compensation of the first-phase current signal, the second-phase current signal and the third-phase current signal of the first stator winding.

5. The power detecting device of claim 4, wherein the controlling module further comprises:
   a first switch coupled to the first power module; and
   a second switch coupled to the second power module;

wherein the controller synchronizes the first power module and the second power module through the first switch and the second switch.

6. The power detecting device of claim 1, wherein the battery detecting module comprises:
   a third current sensor connected in series to the first power supply;
   a voltage sensor connected in parallel to the first power supply;
   a third amplifier electrically connected to the third current sensor for outputting the current signal; and
   a fourth amplifier electrically connected to the voltage sensor for outputting the voltage signal.

7. The power detecting device of claim 1, further comprising:
   a second power supply having a first end and a second end, wherein the first end of the second power supply is electrically connected to the controlling module for driving the controlling module, and the second end of the second power supply is electrically connected to the first power supply.

8. The power detecting device of claim 1, wherein the first power module comprises:
   two first power elements connected in series with each other to form a first bridge arm, wherein the first bridge arm is electrically connected to the second end of the first current sensor;
   two second power elements connected in series with each other to form a second bridge arm, wherein the second bridge arm is electrically connected to the second end of the second current sensor; and
   two third power elements connected in series with each other to form a third bridge arm, wherein the third bridge arm is electrically connected to the third-phase winding end of the first stator winding.

9. The power detecting device of claim 1, wherein the second power module comprises:
   two first power elements connected in series with each other to form a first bridge arm, wherein the first bridge arm is electrically connected to the first-phase winding end of the second stator winding;
   two second power elements connected in series with each other to form a second bridge arm, wherein the second bridge arm is electrically connected to the second-phase winding end of the second stator winding; and
   two third power elements connected in series with each other to form a third bridge arm, wherein the third bridge arm is electrically connected to the third-phase winding end of the second stator winding.

10. A power detecting method, which is configured to detect a vehicle driving system, comprising:
    a providing step performed to provide a first power supply to drive the vehicle driving system, wherein the vehicle driving system comprises a three-phase motor;
    a paralleling step performed to connect a first stator winding and a second stator winding of the three-phase motor in parallel, wherein the first stator winding and the second stator winding are synchronized with each other, and each of the first stator winding and the second stator winding comprises a first-phase winding end, a second-phase winding end and a third-phase winding end;
    a battery measuring step performed to drive a battery detecting module to measure a current signal and a voltage signal of the first power supply;
    a receiving step performed to drive a controlling module to receive the current signal and the voltage signal, and generate a first power according to the current signal and the voltage signal, wherein the controlling module comprises a controller and a database;
    a calculating step performed to drive the controller to calculate a plurality of data of the database to generate a second power; and
    a comparing step performed to drive the controller to compare the first power with the second power to generate a detecting result.

11. The power detecting method of claim 10, wherein the paralleling step comprises:
    a first winding measuring step performed to drive a first current sensor to measure a first-phase current of the first stator winding according to the first-phase winding end of the first stator winding; and
    a second winding measuring step performed to drive a second current sensor to measure a second-phase current of the first stator winding according to the second-phase winding end of the first stator winding.

12. The power detecting method of claim 11, wherein the paralleling step further comprises:
    a first converting step performed to drive a first amplifier to receive the first-phase current of the first stator winding, and convert the first-phase current into a first-phase current signal; and
    a second converting step performed to drive a second amplifier to receive the second-phase current of the first stator winding, and convert the second phase-current into a second-phase current signal.

13. The power detecting method of claim 12, wherein the paralleling step further comprises:
    a procedure calculating step performed to drive the controller to calculate the first-phase current signal and the second-phase current signal according to a calculating procedure to generate a third-phase current signal of the first stator winding; and
    a controlling step performed to drive the controller to synchronize a first power module and a second power module to operate the vehicle driving system according to a feedback compensation of the first-phase current signal, the second-phase current signal and the third-phase current signal of the first stator winding.

* * * * *